United States Patent
Marupaduga

(10) Patent No.: US 11,197,213 B1
(45) Date of Patent: Dec. 7, 2021

(54) CONTROLLING CONNECTIVITY OF LOW-BATTERY-ENERGY DEVICE BASED ON UPLINK NOISE IN SERVING CELL

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 0 days.

(21) Appl. No.: 16/947,324

(22) Filed: Jul. 28, 2020

(51) Int. Cl.
  *H04W 36/00* (2009.01)
  *H04W 52/02* (2009.01)
  *H04W 36/20* (2009.01)
  *H04W 36/08* (2009.01)

(52) U.S. Cl.
  CPC .. *H04W 36/00837* (2018.08); *H04W 36/0058* (2018.08); *H04W 36/0094* (2013.01); *H04W 36/08* (2013.01); *H04W 36/20* (2013.01); *H04W 52/0261* (2013.01)

(58) Field of Classification Search
  CPC ......... H04W 36/00837; H04W 36/20; H04W 36/08; H04W 36/0094; H04W 36/0058; H04W 52/0261
  See application file for complete search history.

(56) References Cited

U.S. PATENT DOCUMENTS

| | | | |
|---|---|---|---|
| 10,142,085 B2 * | 11/2018 | Beattie, Jr. | H04W 52/0212 |
| 10,433,222 B1 | 10/2019 | Marupaduga et al. | |
| 2013/0223235 A1 | 8/2013 | Hu et al. | |
| 2013/0244669 A1 | 9/2013 | Das et al. | |
| 2016/0295515 A1 * | 10/2016 | Cai | H04W 52/0261 |
| 2019/0379445 A1 * | 12/2019 | De Rosa | G08G 5/0069 |

* cited by examiner

*Primary Examiner* — Marisol Figueroa

(57) ABSTRACT

A method and system for controlling connectivity of a user equipment device (UE). When the UE is connected with an access node in a cell provided by the access node, the access node determines that uplink noise in the cell is threshold high. And responsive to at least determining that uplink noise in the cell is at least threshold high, the access node applies a battery-level-based UE-offloading process to offload the UE from the cell. For instance, the access node could cause the UE to hand over or otherwise transition from being connected in the cell to instead being connected in another cell.

20 Claims, 5 Drawing Sheets

CONTROLLING CONNECTIVITY OF LOW-BATTERY-ENERGY DEVICE BASED ON UPLINK NOISE IN SERVING CELL

BACKGROUND

A typical wireless communication system includes a number of access nodes that are configured to provide wireless coverage areas, referred to as cells, in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has explored developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each cell could operate on a radio-frequency (RF) carrier, which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in RF spectrum) having a bandwidth and a center frequency and thus extending from a low-end frequency to a high-end frequency.

On the downlink and uplink channels, the coverage of each cell could define an air interface configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry synchronization signals that UEs could detect as an indication of the presence of coverage and to establish frame timing, other resource elements could be reserved to carry a reference signal that UEs could measure in order to determine coverage strength, and still other resource elements could be reserved to carry other control signaling such as PRB-scheduling directives and acknowledgement messaging from the access node to served UEs. And on the uplink, certain resource elements could be reserved to carry random access signaling from UEs to the access node, and other resource elements could be reserved to carry other control signaling such as PRB-scheduling requests and acknowledgement signaling from UEs to the access node.

OVERVIEW

When a UE enters into coverage of such a system, the UE could initially scan for coverage on one or more carriers and could detect threshold strong coverage of a given cell provided by a given access node (e.g., a threshold strong reference signal broadcast by the access node in that cell) and could then engage in random-access and connection signaling with the access node to establish an air-interface connection, such as a Radio Resource Control (RRC) connection, through which the access node will then serve the UE in the cell.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including an access-bearer portion that extends between the access node and a core-network gateway that provides connectivity with a transport network and a data-radio-bearer (DRB) portion that extends over the air between the access node and the UE.

Once the UE is so connected and registered, the access node could then serve the UE over the established air-interface connection, managing downlink air-interface communication of data to the UE and uplink air-interface communication of data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) message that designates the allocated PRBs and a modulation and coding scheme (MCS) to be used for the transmission, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI message that designates those upcoming PRBs and an MCS to be used for the transmission. And the UE could then accordingly transmit the transport block to the access node in the designated PRBs.

For each such transmission on the downlink and the uplink, the receiving end (i.e., the UE or the access node) could determine whether it received the transport block successfully from the transmitting end (i.e., the access node or the UE). For instance, the transmission could carry a cyclic redundancy check (CRC) value computed based on the transport block, and the receiving end could compute a CRC based on the received transport block and determine whether its computed CRC matches that carried by the transmission. If the receiving end receives the transmission and determines that the CRC matches, then the receiving end could transmit to the transmitting end a positive acknowledgement (ACK) control message. Whereas, if the receiving end does not receive the transmission or determines that the CRC does not match and thus that there was an error in the received transport block, then the receiving end could transmit to the transmitting end a negative acknowledgement (NACK), in response to which the transmitting end could then attempt retransmission.

In such as system, the UE could be equipped with a variable-gain power amplifier and associated logic that enables the UE to transmit on the uplink with dynamically set transmit power. And as the access node serves the UE, the access node and UE could regularly engage in a power control process that works to control the UE's transmit power.

In an example of such a power control process, an uplink receiver at the access node could estimate a receive signal-to-interference-plus-noise ratio (SINR) of transmission from the UE on a per subframe basis or the like and could compare that SINR with a SINR target (which might be dynamically set based on observed uplink communication error rate). When the SINR is below the SINR target, the access node could then transmit to the UE a power-up transmit power control (TPC) command to which the UE would respond by incrementally increasing its transmit power. Whereas, when the SINR is above the SINR target, the access node could transmit to the UE a power-down TPC command to which the UE would respond by incrementally decreasing its transmit power.

One technical issue with any such system is the level of uplink noise received by the access node when the access node is attempting to receive and decode scheduled transmissions from one or more served UEs. Such uplink noise could arise from other electromagnetic radiation that exists in the same RF band and on the same RF subcarriers as the uplink UE transmissions. In particular, sources of this noise could include natural RF radiation (e.g., atmospheric interference), other served UEs transmitting to the access node on the same or similar frequencies, other wireless operators operating on the same or similar frequencies, or other nearby devices (e.g., transformers or other electronic systems) radiating on the same or similar frequencies, among other examples. The uplink noise may thus include both naturally occurring noise and signal interference as artificially created noise.

When an access node has a high level of uplink noise, the access node may have difficulty receiving and decoding scheduled uplink transmissions from its served UEs. As a result, the access node may encounter increased uplink transport-block errors and consequently an increased rate of uplink retransmission, which could reduce overall uplink throughput and reduce uplink-PRB availability.

Further, the presence of this high uplink noise could result in the access node causing its served UEs to transmit with higher uplink transmit power than they would otherwise use for their transmissions. In particular, the high uplink noise could result in the access node estimating relatively low SINR of received transmissions from the UEs and the access node therefore more likely sending power-up TPC commands to the UEs to cause the UEs to increase their uplink transmit power.

This technical issue can be especially problematic for a UE that is battery powered, and even more so for such a UE that has low remaining battery energy in the first place, as having such a UE operate with increased transmit power could contribute to drain of the UE's limited remaining battery energy. And this increased battery drain may ultimately lead to the UE disabling certain services, losing connectivity, or possibly shutting down altogether, which could pose a user-experience problem.

The present disclosure provides an improvement to help address this issue.

In accordance with the disclosure, an access node will detect when its level of uplink noise is threshold high. And in response to at least detecting that its level uplink noise is threshold high, the access node will then proactively discontinue serving a UE based on the UE having threshold low remaining battery energy.

For example, an access node that provides service in a cell could regularly monitor its level of uplink noise in the cell, and when the access node detects that the monitored level of uplink noise is at least as high as a predefined threshold level of uplink noise, the access node could responsively engage in a battery-level-based UE-offloading process including (i) identifying a UE currently connected with the access node in the cell, with the identifying being based on a determination that the UE's remaining battery energy is at least as low as a predefined threshold level of battery energy and (ii) based on the identifying, causing the identified UE to engage in cell-reselection in an effort to transition the UE to a different cell.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of 4G LTE or 5G NR. It should be understood, however, that the principles disclosed herein could extend to apply with respect to other scenarios as well, such as with respect to other RATs. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations.

Figure 1:
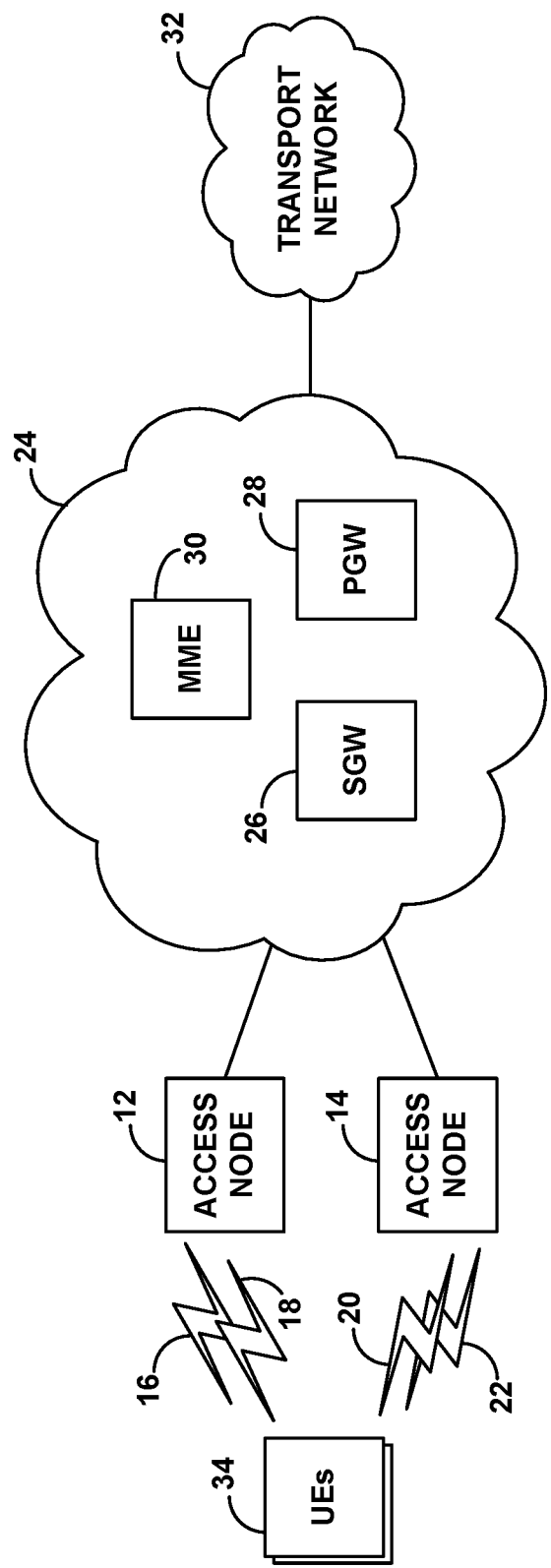
FIG. 1 is a simplified block diagram of an example network arrangement in which aspects of the present disclosure can be implemented.

FIG. 1 is a simplified block diagram of an example system including two example access nodes 12, 14. Each access node might be a 4G LTE evolved Node-B (eNB) or a 5G NR next-generation Node-B (gNB), among other possibilities. Further, each access node 12 might be a macro access node of the type configured to provide a wide range of coverage or could take other forms, such as a small cell access node, a relays, a femtocell access node, or the like, possibly configured to provide a smaller range of coverage, among other possibilities.

In the example arrangement, each access node is configured to provide service in multiple cells, with each cell defining an air interface as noted above for instance, on a respective carrier. Thus, on the downlink and uplink, the air interface of each cell could be structured as described above, being divided over time into frames, subframes, and symbol time segments, and over frequency into subcarriers, thus defining an array of air-interface resource elements grouped into PRBs allocable by the access node as noted above, for use to carry data to or from served UEs.

In particular, in the example arrangement, access node 12 is shown providing service in cells 16, 18, and access node 14 is shown providing service in cells 20, 22. To facilitate providing this service in each such cell, an access node could be equipped with a wireless communication interface including an antenna structure and transceiver configured to transmit and receive electromagnetic signals with an antenna pattern or radiation pattern defining coverage of the cell.

Further, the illustrated access nodes 12, 14 could be collocated with each other, possibly sharing various cell-site equipment, such as a common cell tower, a common antenna array, or the like, or the access nodes could be positioned at separate locations. In a representative implementation, in any event, the illustrated cells may overlap partly or fully with each other, so that a UE served by an access node in one cell may be able to hand over seamlessly to be served instead by the access node in another cell or by the other access node in another cell.

In the example arrangement of FIG. 1, both access node are shown interfaced with a core network 24, which could be a packet-switched network such as an Evolved Packet Core (EPC) network or Next Generation Core (NGC) network. In the arrangement shown, the core network 24 includes a serving gateway (SGW) 26, a packet data network gateway (PGW) 28, and a mobility management entity (MME) 30, although other arrangements are possible as well.

With this example arrangement, each access node could have an interface with the SGW 26, the SGW 26 could have an interface with the PGW 28, and the PGW 28 could provide connectivity with a transport network 32. Further, each access node could have an interface with the MME 30, and the MME 30 could have an interface with the SGW 26, so that the MME 30 could coordinate setup of bearers for UEs to enable the UEs to engage in packet-data communication on the transport network 32.

FIG. 1 also illustrates one or more example UEs 34 in coverage of the system. Each such UE could take any of the forms noted above, among other possibilities, and could be equipped with a wireless communication interface including an antenna structure and a transceiver that enables the UE to engage in service according to one or more applicable RATs.

In line with the discussion above, when each such UE initially enters into coverage of the system, the UE could discover threshold strong coverage of an access node and could then engage in random-access signaling and RRC signaling with the access node to establish an RRC connection. Further, the access node could establish in data storage a context record for the UE, indicating an operational state of the UE's connection. And the UE could engage in attach signaling with the MME 26, via the access node, and the MME 26 could coordinate setup of one or more bearers for the UE. The access node could then serve the UE in an RRC-connected mode, scheduling downlink communication to the UE and uplink communication from the UE.

For present purposes, we can assume that each of one or more such UEs 34 is currently connected with access node 12 in cell 16.

As noted above, each such UE could have a variable-gain amplifier that the UE could use to set its uplink transmit power. And each such UE could engage in uplink power control with the access node 12 to dynamically control its uplink transmit power. As discussed above, for instance, the access node 12 could regularly monitor the SINR of received uplink communications from the UE and, based on a set-point comparison, could send power-down or power-up TPC commands to the UE, and the UE could accordingly adjust its uplink transmit power. The UE may also have a maximum uplink transmit power level specified by industry standards or government regulations.

Further, each such UE could be equipped with a rechargeable battery (e.g., one or more such batteries) that stores energy and provides power to drive operations of the UE, including but not limited to the UE's uplink transmission.

The UE's battery could be rated or configured to store up to a maximum amount of energy, which could be measured in units of energy such as ampere-hours (Ah), milliampere-hours (mAh), voltage (V), or the like. And as the UE consumes this battery energy, at any given time the UE will thus have a remaining battery energy level (or state of charge) defining the amount of energy remaining in the UE's battery, which could be quantified as a number of units of energy and/or as a percentage of the battery's maximum energy capacity, among other possibilities.

In practice, the UE could regularly monitor its remaining battery energy level, using any battery-energy-monitoring technique now known or later developed. For example, the UE could apply a voltmeter to measure the open circuit voltage at terminals of its battery and could deem its remaining battery energy level to be the measured battery voltage. Alternatively, the UE could apply coulomb counting, integrating a quantity of electrical charge injected into or withdrawn from the battery over time, and could deem the remaining battery energy level to be a percentage of the battery's maximum charge capacity. Other examples are possible as well.

Further, while the UE is connected with the access node 12, the UE could report its remaining battery energy level to the access node, perhaps within RRC messages, scheduling requests, and/or other messages that the UE sends to the access node. For instance, the UE could report its remaining battery energy level to the access node periodically and/or at other times, such as whenever the UE sends a scheduling request to the access node and/or in response to the UE detecting that its remaining battery energy level has dropped to a threshold low level, the UE detecting that its remaining battery energy level has risen back up (e.g., through recharging) to a level that is not threshold low, and so forth.

The UE's reporting of its remaining battery energy level to the access node could indicate a specific remaining battery energy level of the UE and/or could indicate a general battery-energy state of the UE, such as whether or not the UE's remaining battery energy level is threshold low, among other possibilities. And based on this battery-energy level reporting, the access node could store and regularly maintain in the UE context record an indication of the UE's remaining battery energy level, for reference while serving the UE.

In line with the discussion above, while the access node 12 serves one or more UEs in cell 16, the access node could also regularly monitor the level of uplink noise in the cell. And the access node could use the monitored level of uplink noise in the cell as a basis to trigger a battery-level-based UE-offloading process.

The access node could regularly measure the uplink noise in the cell by measuring a level of electromagnetic energy on the uplink channel of the cell's carrier, perhaps at times when there is no uplink transmission scheduled on the carrier so that the measured energy could represent an uplink noise-floor (on top of which scheduled uplink communications would occur). Further, the access node could measure this uplink energy level across the carrier's full uplink bandwidth or perhaps specifically on an uplink shared channel or other portion of the carrier, among other possibilities.

Through this monitoring, the access node could determine when the uplink noise in the cell is threshold high—perhaps when the measured level of uplink noise is at least as high as a predefined threshold noise level set by engineering design and/or based on one or more factors. Without limitation, an example of such a threshold could be −95 decibel-milliwatts (dBm). The access node could make this determination by comparing the measured level of uplink noise in the cell with the predefined threshold level to determine if the measured level is at least as high as the threshold level. Further, the act of determining that the uplink noise in the cell is threshold high could require a determination that the uplink noise has been at least as high as the predefined threshold for minimum defined period of time.

When the access node determines that the noise in cell 16 is threshold high, the access node could respond to at least that determination by invoking the battery-level-based UE-offloading process.

As noted above, the battery-level-based UE-offloading process that the access node 12 invokes in response to at least the uplink noise in cell 16 being threshold high could involve the access node identifying each of one or more UEs that is connected with the access node 12 in cell 16 and that has threshold low remaining battery energy, and the access node 12 offloading each such identified UE from cell 16.

By way of example, the access node 12 could refer to context-record data that the access node has stored respectively for each of one or more UEs connected with the access node 12 in cell 16, to identify each such connected UE whose remaining battery energy level is at least as low as a predefined threshold battery energy level. For instance, for each UE connected with the access node in cell 16, the access node 12 could compare the UE's most recent reported remaining battery energy level with the predefined threshold low battery energy level, to determine if the UE's remaining battery energy level is at least as low as the threshold level.

Alternatively or additionally, if the access node 12 does not have a current indication of remaining battery energy level of a UE that is connected with the access node 12 in cell 16, the access node could request and receive from the UE a report of the UE's remaining battery energy level, and the access node could determine if the reported remaining battery energy level is threshold low.

In a scenario where the access node has just one connected UE, the act of identifying each of one or more connected UEs based on the UE having threshold low remaining battery energy could involve the access node identifying the one connected UE based on a determination that the one UE has threshold low remaining battery energy. Whereas, in a scenario where the access node has multiple connected UEs, the act of identifying each of one or more connected UEs based on the UE having threshold low remaining battery energy could involve the access node selecting each of one or more of the connected UEs based a determination per selected UE that the selected UE has threshold low remaining battery energy.

The access node could also base or condition its identification of each of one or more such UEs on one or more additional factors. For instance, the access node could condition its identification of a given such UE on the UE also being within threshold weak downlink coverage of the access node in cell 16, considering reference-signal-receive-power (RSRP) reporting from the UE or the like.

For each UE that the access node 12 identifies based at least on the UE having threshold low remaining battery energy when cell 16 has threshold high uplink noise, the access node 12 could respond to the identifying of the UE by working to offload the UE from cell 16. For instance, the access node 12 could responsively work to transition the UE from being connected with the access node 12 in cell 16 to instead being connected with the access node 12 in cell 18 or to instead being connected with the other access node 14 in cell 20 or cell 22.

This offloading process could involve the access node 12 transmitting to the UE an RRC message that carries a cell-reselection directive, to which the UE is configured to respond by scanning for and seeking to connect in a different cell. Further or alternatively, the access node 12 could transmit to the UE a measurement object specifying a measurement threshold (e.g., a minimum reference-signal-receive-power (RSRP) level), to which the UE is configured to respond by scanning for coverage of another cell that is at least as strong as the indicated measurement threshold and reporting any such detected coverage to access node 12 to trigger handover of the UE to the other such cell. And still further or alternatively, the access node 12 could transmit to the UE a release-and-redirect message that accomplishes a similar result.

This offloading process could thus result in the UE disconnecting or being disconnected from the access node 12 in cell 16 and the UE scanning for and newly connecting in another cell. Or the offloading process could result in the access node 12 processing handover or other transition of the UE to another cell. For instance, if the transition is from cell 16 to cell 18, the access node 12 might simply switch the carrier in the UE's connection to be the carrier of cell 18 and notify the UE of the switch, so that the UE would then continue to be served by the access node 12 but now in cell 18 rather than cell 16. Or if the transition is from cell 16 to cell 20 provided by access node 14, access node 12 could engage in handover signaling with access node 14 via an inter-access-node interface such an X2 interface, to prepare access node 14 for the handover, and access node 12 could then direct the UE to switch to cell 20, which the UE might complete by engaging in random-access signaling with access node 14 for instance. Other offloading processes could be possible as well.

Figure 2:
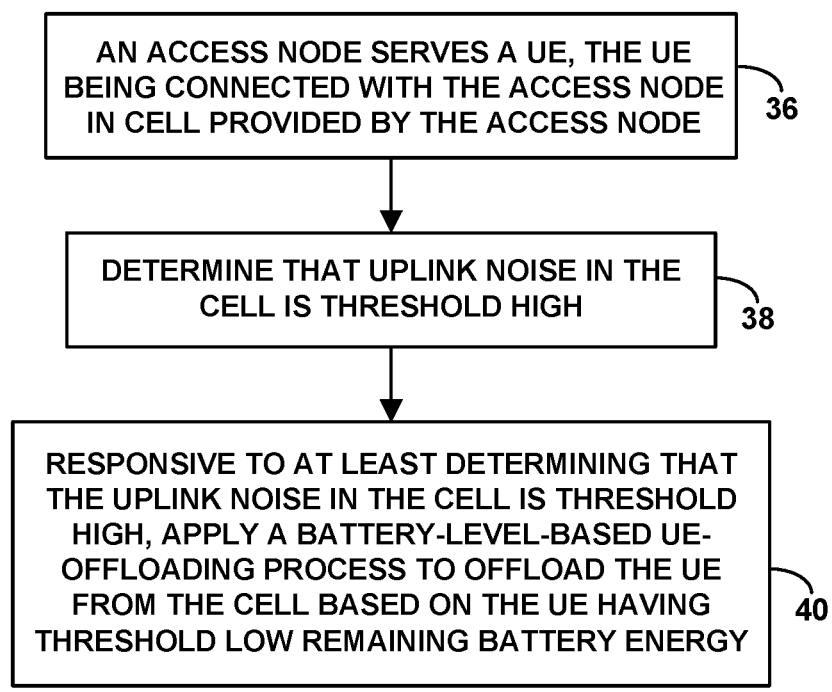
FIG. 2 is a flow chart depicting an example method in accordance with the disclosure.

FIG. 2 is next a flow chart depicting a method that could be carried out in accordance with the present disclosure to control connectivity of a UE in a wireless communication system that includes multiple cells, where a first access node is configured to provide at least a first one of the cells.

As shown in FIG. 2, at block 36, the method includes the first access node serving at least a first UE, the first UE being connected with the first access node in the first cell. At block 38, the method then includes, while the first UE is connected with the first access node in the first cell, the first access node determining that uplink noise in the first cell is threshold high. And at block 40, the method includes, responsive to at least determining that the uplink noise in the first cell is threshold high, the first access node applying a battery-level-based UE-offloading process to offload the first UE from the first cell based on the first UE having threshold low remaining battery energy.

In line with the discussion above, the act of the first access node determining that the uplink noise in the first cell is threshold high could involve the first access node determining that the uplink noise in the first cell is at least as high as a defined noise threshold. Further, the act of determining that the uplink noise in the first cell is at least as high as the defined noise threshold could involve (i) measuring the uplink noise in the first cell, (ii) comparing the measured uplink noise in the first cell with the defined noise threshold, and (iii) based on the comparing, determining that the measured uplink noise in the first cell is at least as high as the defined noise threshold.

Here, the access node could any of various techniques now known or later developed to measure the uplink noise in the first cell. And as noted above, the first cell could define an uplink frequency channel, and the act of measuring the uplink noise in the first cell could involve measuring the uplink noise on the uplink frequency channel in absence of scheduled uplink data transmission to the first access node on the uplink frequency channel.

As further discussed above, the act of applying the battery-level-based UE-offloading process in this method could involve (i) determining that the remaining battery energy of the first UE is at least as low as a defined battery-energy threshold and (ii) responsive to at least determining that the remaining battery energy of the first UE at least as low as the defined battery-energy threshold, offloading the first UE from the first cell.

To facilitate this as discussed above, the first access node could receive from the first UE a report of the remaining battery energy of the UE. And the act of determining that the remaining battery energy of the first UE is at least as low as the defined battery-energy threshold could involve (i) comparing the reported remaining battery energy of the first UE with the defined battery-energy threshold and (ii) based on the comparing, determining that the remaining battery energy of the first UE is at least as low as the defined battery-energy threshold.

Yet further, as discussed above, the act of offloading the first UE from the first cell could be additionally responsive to one or more other factors on top of the combination of the uplink noise in the first cell being threshold high and the UE having threshold low remaining battery energy. For instance, the first access node could additionally base the offloading on a determination that the first cell is threshold highly loaded (e.g., having at least predefined threshold high PRB utilization and/or quantity of connected UEs). In one implementation, for example, such high cell loading could be a condition for the offloading to occur responsive to the high uplink noise and low remaining battery energy.

Still further, as discussed above, the first access node could also be configured to provide a second cell, and offloading of the first UE from the first cell could involve transitioning the first UE from being connected with the first access node in the first cell to being connected with first access node instead in the second cell. Or a second access node could be configured to provide a second cell, and offloading the first UE from the first cell could involve transitioning the first UE from being connected with the first access node in the first cell to being connected instead with second access node in the second cell.

Figure 3:
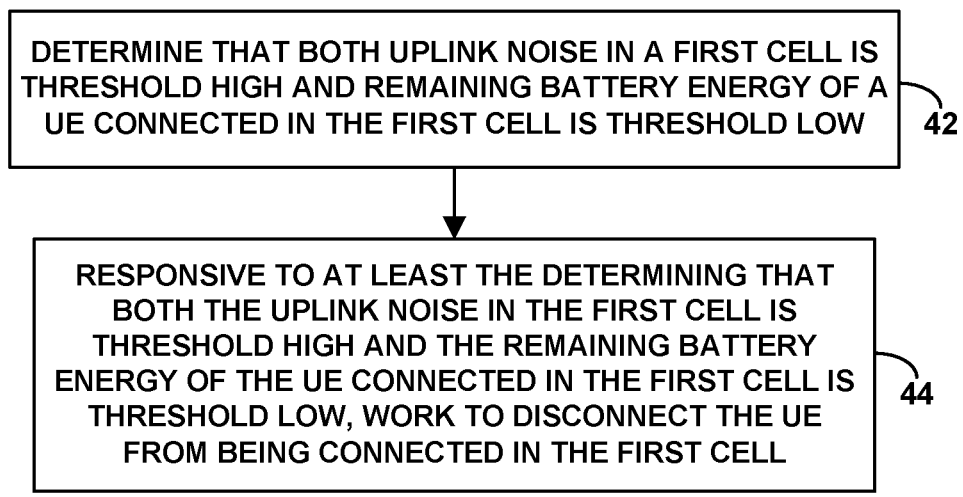
FIG. 3 is another flow chart depicting an example method in accordance with the disclosure.

FIG. 3 is next another flow chart depicting a method that could be carried out in accordance with the present disclosure to control connectivity of a UE in a wireless communication system that includes multiple cells, where a first access node is configured to provide at least a first one of the cells.

As shown in FIG. 3, at block 42, the method includes determining that both uplink noise in the first cell is threshold high and remaining battery energy of a UE connected with the first access node in the first cell is threshold low. And at block 44, the method includes, responsive to at least the determining that both the uplink noise in the first cell is threshold high and the remaining battery energy of the UE connected with the first access node in the first cell is threshold low, the first access node working to disconnect the UE from being connected with the first access node in the first cell.

Various features described herein can be implemented in this context as well, and vice versa.

For instance, the act of determining that both uplink noise in the first cell is threshold high and remaining battery energy of a UE connected with the first access node in the first cell is threshold low could involve (i) measuring the uplink noise in the first cell, and determining that the measured uplink noise is at least as high as a defined noise threshold and (ii) receiving from the UE a report of the remaining battery energy of the UE, and determining that the reported remaining battery energy of the UE is at least as low as a defined battery-energy threshold.

Further, the act of the first access node working to disconnect the UE from being connected with the first access node in the first cell comprises the first access node signaling to the UE to cause the UE to scan for a target cell to which to hand over. And additionally or alternatively, the act of the first access node working to disconnect the UE from being connected with the first access node in the first cell could include the first access node processing a handover or other transition of the UE from the first cell to a second cell (provided by the first access node or a second access node).

Figure 4:
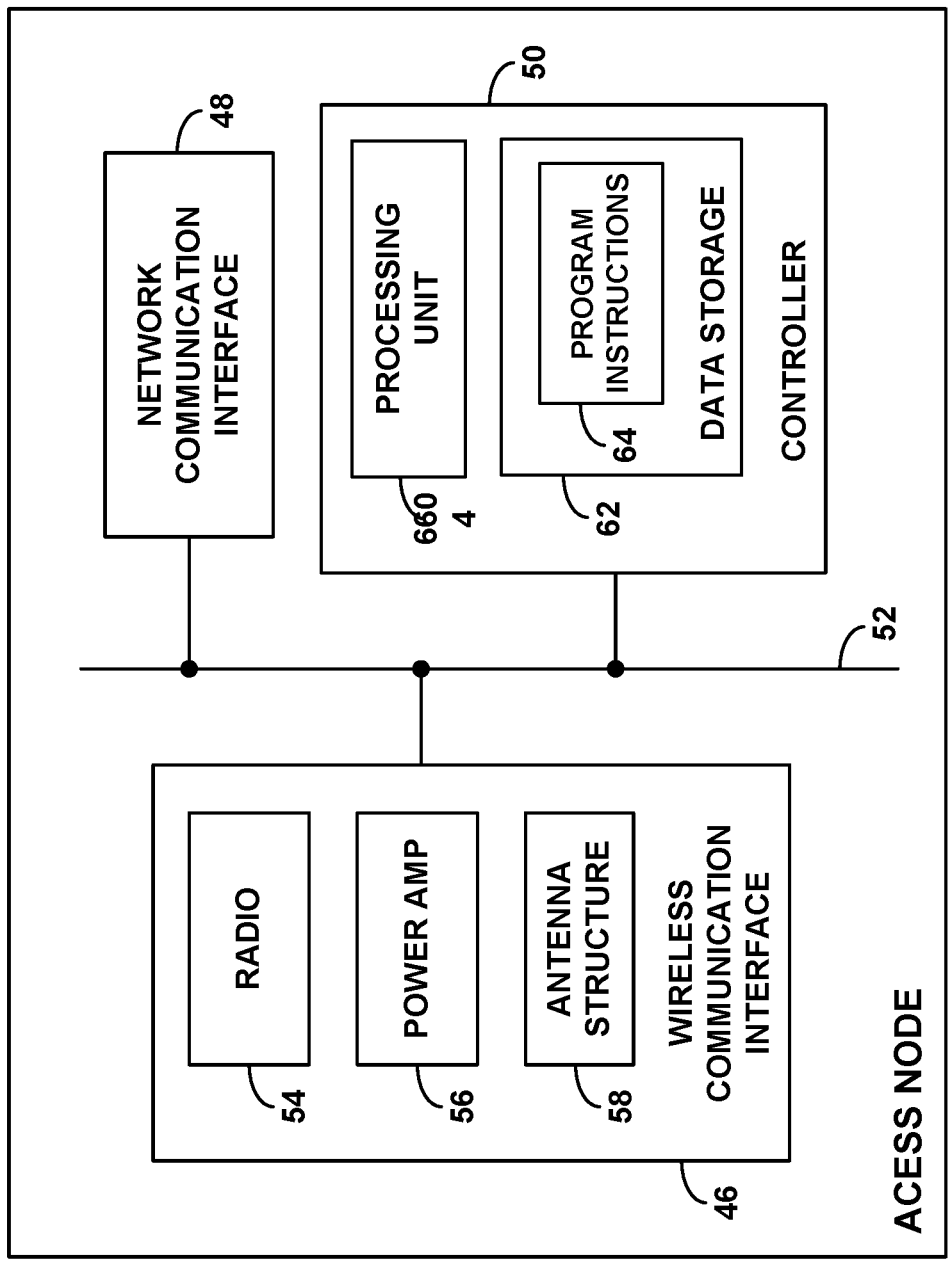
FIG. 4 is a simplified block diagram of an example access node operable in accordance with the disclosure.

FIG. 4 is next a simplified block diagram of an access node that could operate in accordance with the present disclosure. As shown, the example access node includes a wireless communication interface 46, a network communication interface 48, and a controller 50, which could be integrated together and/or communicatively linked together by a system bus, network, or other connection mechanism 52.

The wireless communication interface 46 could comprise a radio 54, a power amplifier 56, and antenna structure 58. The radio 54 could operate to interface between encoded baseband signals and radio frequency signals. The power amplifier 56 could operate to amplify signals for transmission by the antenna structure 58. And the antenna structure 58 could comprise a plurality of antennas for communicating over the air interface, such as a massive-MIMO array for instance, which could facilitate beamforming and other operations.

The network communication interface 48 could comprise a wired or wireless interface, such as an Ethernet network communication interface, configured to support communication with other entities, such as with the other access node and various core-network entities.

Further, controller 50 could comprise at least one processing (e.g., one or more general purpose processors and/or specialized processors) 60 programmed to cause the access node to carry out various operations such as those discussed herein. For instance, the controller could additionally comprise at least one non-transitory data storage (e.g., one or more magnetic, optical, or flash storage components) 62 holding program instructions 64 executable by the at least one processing unit 60 to cause the access node to carry out such operations.

In line with the discussion above, the operations could include (i) determining that uplink noise in the cell is threshold high and (ii) responsive to at least determining that the uplink noise in the cell is threshold high, applying a battery-level-based UE-offloading process to offload the UE from the cell based on the UE having threshold low remaining battery energy.

Various features described herein can be implemented in this context as well, and vice versa.

Figure 5:
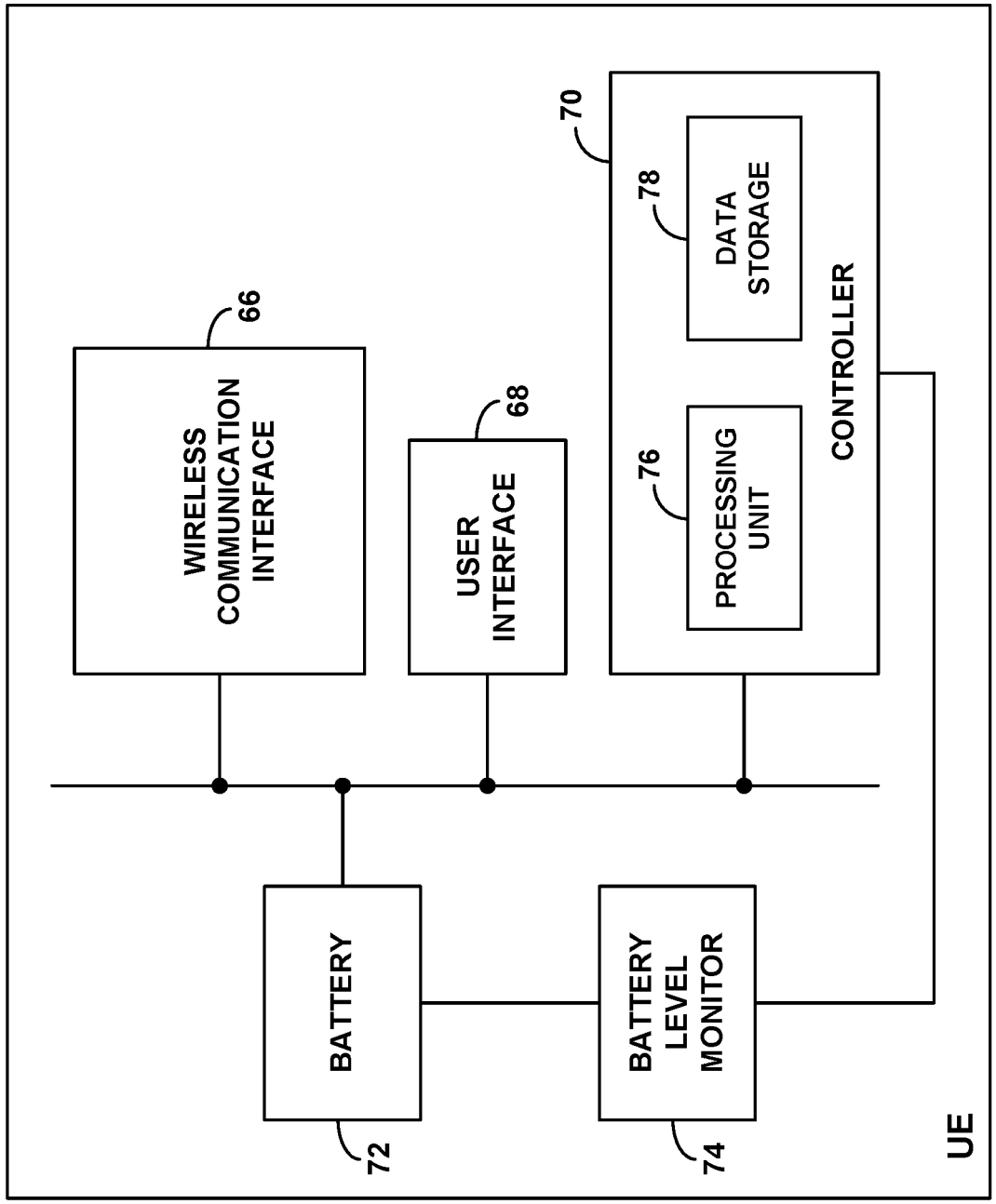
FIG. 5 is a simplified block diagram of an example UE operable in accordance with the disclosure.

Finally, FIG. 5 is a simplified block diagram of an example UE, showing some of the components that could be included to facilitate carrying out operations as described herein.

As shown in FIG. 5, the example UE includes a wireless communication interface 66, a user interface 68, a controller 70, a battery 72, and a battery level monitor 74. These components could be interconnected, integrated, and/or communicatively linked together in various ways now known or later developed. For simplicity, the figure generally depicts the battery 72 being interconnected with the wireless communication interface 66, user interface 68, and controller 70, and the figure generally depicts the battery level monitor 74 being interconnected with the battery 72 and the controller 70. Numerous other arrangements are also possible.

Wireless communication interface 66 operates to facilitate air interface communication, including connection with and service by one or more access nodes in accordance with an agreed RAT. And user interface 68, which could be included if the UE is user operated, could include input and output components to facilitate interaction with a user. For instance, the user interface could include analog-to-digital conversion circuitry and could include input components such as a touch screen, microphone, and keypad, and output components such as a display screen and sound speaker.

Controller 70, which could be integrated with wireless communication interface 66 (e.g., on a common chipset) or provided in another manner could operate to carry out or cause the UE to carry out various UE operations described herein. As shown, controller 70 could include a processing unit 76 (e.g., one or more general purpose processors such as microprocessors and/or one or more special purpose processors such as application specific integrated circuits), and non-transitory data storage 78 (e.g., one or more volatile and/or non-volatile storage components, such as magnetic, optical and/or flash storage). And non-transitory data storage 78 could hold program instructions, which could be executable by the processing unit 76 to carry out the various UE operations.

Battery 72 could be configured to provide energy to support operation of the example UE when the example UE is not connected with another energy source, and the battery could be rechargeable. Further, the battery 72 could take various forms, examples of which include nickel metal hydride (NiMH), nickel cadmium (NiCd), Lithium Ion (Li-Ion), and lithium polymer (Li-Poly), or others now known or later developed.

Battery level monitor 74 could operate to regularly monitor the remaining battery energy level of battery 72 and to provide an output signal indicating a latest determined remaining battery energy level, which the processing unit could report via the wireless communication interface 66 to a serving access node as discussed above. As such, battery level monitor 74 could take various forms as discussed above, such as a voltmeter or a coulomb counter, among other possibilities. Further, the battery level monitor 74 could be integrated with the battery 72 itself or could be provided separately and interconnected with the battery.

Various features described above can be carried out in this context as well, and vice versa.

The present disclosure also contemplates a computer readable medium having stored thereon (e.g., encoded with) program instructions executable by a processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling connectivity of a user equipment device (UE) in a wireless communication system comprising a plurality of cells, wherein a first access node is configured to provide at least a first cell of the plurality, the method comprising:

serving by the first access node at least a first UE, the first UE being connected with the first access node in the first cell;

while the first UE is connected with the first access node in the first cell, determining by the first access node that uplink noise in the first cell is threshold high; and responsive to at least determining that the uplink noise in the first cell is threshold high, applying by the first access node a battery-level-based UE-offloading process to offload the first UE from the first cell based on the first UE having threshold low remaining battery energy.

2. The method of claim 1, wherein determining by the first access node that the uplink noise in the first cell is threshold high comprises determining by the first access node that the uplink noise in the first cell is at least as high as a defined noise threshold.

3. The method of claim 2, wherein determining that the uplink noise in the first cell is at least as high as the defined noise threshold comprises (i) measuring the uplink noise in the first cell, (ii) comparing the measured uplink noise in the first cell with the defined noise threshold, and (iii) based on the comparing, determining that the measured uplink noise in the first cell is at least as high as the defined noise threshold.

4. The method of claim 3, wherein the first cell defines an uplink frequency channel, and wherein measuring the uplink noise in the first cell comprises measuring the uplink noise on the uplink frequency channel in absence of scheduled uplink data transmission to the first access node on the uplink frequency channel.

5. The method of claim 1, wherein applying the battery-level-based UE-offloading process comprises:
   determining that the remaining battery energy of the first UE is at least as low as a defined battery-energy threshold; and
   responsive to at least determining that the remaining battery energy of the first UE at least as low as the defined battery-energy threshold, offloading the first UE from the first cell.

6. The method of claim 5, further comprising receiving by the first access node from the first UE a report of the remaining battery energy of the UE,
   wherein determining that the remaining battery energy of the first UE is at least as low as the defined battery-energy threshold comprises (i) comparing the reported remaining battery energy of the first UE with the defined battery-energy threshold and (ii) based on the comparing, determining that the remaining battery energy of the first UE is at least as low as the defined battery-energy threshold.

7. The method of claim 5, wherein offloading the first UE from the first cell is additionally responsive to a determination that the first cell is threshold highly loaded.

8. The method of claim 5, wherein the first access node is further configured to provide a second cell of the plurality, and wherein offloading the first UE from the first cell comprises transitioning the first UE from being connected with the first access node in the first cell to being connected with first access node instead in the second cell.

9. The method of claim 5, wherein a second access node is configured to provide a second cell of the plurality, and wherein offloading the first UE from the first cell comprises transitioning the first UE from being connected with the first access node in the first cell to being connected instead with second access node in the second cell.

10. A method for controlling connectivity of a user equipment device (UE) in a wireless communication system comprising a plurality of cells, wherein a first access node is configured to provide at least a first cell of the plurality, the method comprising:
   determining that both uplink noise in the first cell is threshold high and remaining battery energy of a UE connected with the first access node in the first cell is threshold low; and
   responsive to at least the determining that both the uplink noise in the first cell is threshold high and the remaining battery energy of the UE connected with the first access node in the first cell is threshold low, working by the first access node to disconnect the UE from being connected with the first access node in the first cell.

11. The method of claim 10, wherein determining that both uplink noise in the first cell is threshold high and remaining battery energy of a UE connected with the first access node in the first cell is threshold low comprises:
   measuring the uplink noise in the first cell, and determining that the measured uplink noise is at least as high as a defined noise threshold; and
   receiving from the UE a report of the remaining battery energy of the UE, and
   determining that the reported remaining battery energy of the UE is at least as low as a defined battery-energy threshold.

12. The method of claim 10, wherein working by the first access node to disconnect the UE from being connected with the first access node in the first cell comprises the first access node signaling to the UE to cause the UE to scan for a target cell to which to hand over.

13. The method of claim 10, wherein working by the first access node to disconnect the UE from being connected with the first access node in the first cell further comprises the first access node processing a transition of the UE from the first cell to a second cell.

14. The method of claim 13, wherein the second cell is also provided by the first access node.

15. The method of claim 13, wherein the second cell is provided by a second access node.

16. An access node comprising:
   a wireless communication interface through which to serve user equipment devices (UEs) in a cell defining a downlink and an uplink; and
   a controller, wherein the controller is configured to cause the access node to carry out operations when a UE is connected with the access node in the cell, the operations including:
      determining that uplink noise in the cell is threshold high; and
      responsive to at least determining that the uplink noise in the cell is threshold high, applying a battery-level-based UE-offloading process to offload the UE from the cell based on the UE having threshold low remaining battery energy.

17. The access node of claim 16, wherein the controller comprises at least one processing unit, at least one non-transitory data storage, and program instructions stored in the at least one non-transitory data storage and executable by the at least one processing unit to cause the access node to carry out the operations.

18. The access node of claim 16, wherein applying the battery-level-based UE-offloading process comprises:
   determining that the remaining battery energy of the UE is at least as low as a defined battery-energy threshold; and
   responsive to at least determining that the remaining battery energy of the UE at least as low as the defined battery-energy threshold, offloading the UE from the cell.

19. The access node of claim 18, wherein the operations additionally include receiving from the first UE a report of the remaining battery energy of the UE,
   wherein determining that the remaining battery energy of the UE is at least as low as the defined battery-energy threshold comprises (i) comparing the reported remaining battery energy of the UE with the defined battery-energy threshold and (ii) based on the comparing, determining that the remaining battery energy of the UE is at least as low as the defined battery-energy threshold.

20. The access node of claim 18, wherein offloading the UE from the cell comprises transitioning the UE from being connected in the cell to being connected instead in another cell.

\* \* \* \* \*